United States Patent [19]
Carse

[11] Patent Number: 4,811,332
[45] Date of Patent: Mar. 7, 1989

[54] APPARATUS AND METHOD FOR TDM DATA SWITCHING

[75] Inventor: Gregg D. Carse, Mountain View, Calif.

[73] Assignee: Pacific Bell, San Francisco, Calif.

[21] Appl. No.: 856,640

[22] Filed: Apr. 25, 1986

[51] Int. Cl.$^4$ .............................................. H04J 3/02
[52] U.S. Cl. .......................................... 370/58; 370/68
[58] Field of Search .................... 370/66, 67, 68, 85, 370/86, 58, 84

[56] References Cited

U.S. PATENT DOCUMENTS

| | | |
|---|---|---|
| 3,890,469 | 6/1975 | Kelly et al. ............................ 370/60 |
| 3,914,553 | 10/1975 | Melindo et al. ...................... 370/119 |
| 3,963,870 | 6/1976 | Couder et al. ........................ 370/66 |
| 3,971,891 | 8/1976 | Wolcott ................................. 370/66 |
| 3,971,892 | 8/1976 | Schlichte .............................. 370/86 |
| 4,004,099 | 1/1977 | Jones et al. .......................... 370/85 |
| 4,027,106 | 5/1977 | Belforte et al. ...................... 370/66 |
| 4,060,698 | 11/1977 | Birnie ................................... 370/16 |
| 4,123,624 | 10/1978 | Gagnier et al. ...................... 370/58 |
| 4,154,986 | 5/1979 | Howells et al. ...................... 370/68 |
| 4,228,536 | 10/1980 | Gueldenpfennig et al. ......... 370/66 |
| 4,232,386 | 11/1980 | McDonald et al. ................. 370/68 |
| 4,272,844 | 6/1981 | Roche et al. ......................... 370/66 |
| 4,339,633 | 7/1982 | Ahmed ................................. 370/85 |
| 4,413,338 | 11/1983 | Renoulin et al. .................... 370/89 |
| 4,450,557 | 5/1984 | Munter ................................. 370/58 |
| 4,488,290 | 12/1984 | Dunn et al. .......................... 370/85 |
| 4,771,420 | 9/1988 | Deschaine et al. .................. 370/58 |

FOREIGN PATENT DOCUMENTS

WO85/05241 11/1985 PCT Int'l Appl. ................. 370/67

OTHER PUBLICATIONS

Harold M. Straube, "Chestel Uniloop ETDPABX", 1973 National Telecommunications Conference, vol. I, Atlanta, Ga., USA (Nov. 26–28, 1973), pp. 10E1–10E6.

Primary Examiner—Douglas W. Olms
Assistant Examiner—Melvin Marcelo
Attorney, Agent, or Firm—Fitch, Even, Tabin & Flannery

[57] ABSTRACT

A method and apparatus are described for switching data between one or more first TDM interfaces and one or more second TDM interfaces. Data words are sequentially received from the first TDM interface and are stored in a first memory in a predetermined order. Each stored data word is written out of the first memory to a back plane bus in the predetermined order. Each data word on the back plane bus is read to a second memory such that each data word is stored at a location corresponding to a time slot during which such data word is on the back plane bus. Each data word stored in the second memory is read to the second TDM interface in a predetermined order.

9 Claims, 5 Drawing Sheets

ODD SUPER FRAMES

APPARATUS AND METHOD FOR TDM DATA SWITCHING

The present invention relates generally to TDM data switching and, more particularly, to a novel apparatus and method for full duplex data switching between TDM buses in accordance with the time slot or channel to which each data component is assigned.

BACKGROUND OF THE INVENTION

Telephone switching systems typically constitute a switching network for temporarily establishing transmission paths between various pairs of subscribers. When one subscriber calls another, a path is established between the two subscribers which is an actual electrical path or which, in more sophisticated systems, acts like one. Traditionally, the switching network has been designed to switch analog voice signals between the subscribers using known pulse code modulated (PCM) time division multiplexing (TDM) techniques.

In the switched public network telephone system, a two wire subscriber loop, often called a "twisted pair", connects a subscriber's telephone to a central office switch The subscriber loop carries an analog voice signal. The central office switch pulse code modulates the voice signals from active loops and time multiplexes these pulse code modulated signals to effect switching between active subscriber loops and establish a point-to-point connection between two subscribers In addition, TDM trunk lines interconnect the central offices with each other to effect switching between subscribers served by different central offices.

Increasing levels of interoffice traffic have been accompanied by increasing use of digitized interoffice trunks. The digitization of interoffice communications has had the effect of allowing more TDM channels to be carried on each TDM trunk so that each central office may serve increasing numbers of subscribers and so that higher quality service may be provided to the subscribers. Of course, the central office PCM-TDM switches have to interface with the digital interoffice network. Accordingly, there has been a trend to digitize the central office switches. However, this trend has not been universal. Therefore, many central offices still retain the PCM-TDM switches.

Irrespective of the character of the central office switch, the subscriber loop has, in nearly all public telephone systems, remained a strictly analog portion of the existing switched public network. Therefore, although digitization of switching and communications at the central office has allowed the quality of the basic service to continually improve, the subscriber loop portion of the typical telephone service has remained relatively unchanged.

Recently, there have been many proposals and attempts to digitize the subscriber loop. A primary impetus behind digitizing the subscriber loop is to provide the subscriber with integrated services in a fully digital telephone network. Such integrated services would include, for example, the ability to have a mix of medium speed and low speed data communication channels which could be in use simultaneously with one or more voice communication channels. The proposed integrated services digital networks (ISDN's) would operate on existing two wire, twisted pair subscriber loops, although other vehicles such as optical fiber are also possible. A most apparent advantage of ISDN is that the existing network of subscriber loops would not have to be replaced, nor would they have to be supplemented by additional twisted pair loops to provide the integrated services. Another advantage of the ISDN approach is that the subscriber loop would not have to be selected for either voice or data communications to the exclusion of the other. In the analog loop, data communications must be coupled through a modem to the exclusion of voice communications.

As proposed in typical ISDN systems, the low speed data communication channels would be useful for vendors of certain services, such as home security and alarm services. The medium speed data communication channels would be useful for connection to packet assembler/disassembler (PAD) vendors, such as the Telenet and Tymnet services. In most existing telephone systems, if such services are provided, all of these vendors must interface through the existing subscriber loop to the exclusion of the voice channel or through an additional subscriber loop in which a point-to-point telephone connection can be established. Integrated services digital networks, on the other hand, provide the subscriber far greater flexibility than is now possible with the existing analog subscriber loop. An example of a telephone system providing integrated voice and data services over twisted pair subscriber loops is described in copending application entitled Telephone System, Ser. No. 711,083, filed Mar. 12, 1985, which is assigned to the assignee of the present invention and is incorporated herein by reference.

In designing an integrated services digital network, it becomes necessary to provide at the central office the capability of demultiplexing the digitized voice and data channel information received from each subscriber loop and to switch each voice and data channel to the intended recipient. Since many central office switches cannot switch pure digital data, it often becomes necessary first to terminate the subscriber loop to perform a first order demultiplexing which switches out and converts the voice bits received from the subscriber loop to pulse code modulated (PCM) analog bits for application to the existing central office switch. The PCM encoded voice may then be switched and routed in a conventional manner. The termination may also take the data bits from the subscriber loops and multiplex these onto a TDM bus. The TDM data containing several data channels from each subscriber loop must then be switched to other TDM buses which serve the data services vendors or other intended recipients. To avoid duplication of hardware, it is desirable that the data be switched in a full duplex mode so as to be capable of switching concurrent bidirectional data between the subscriber loops and data services vendors or other intended recipients.

SUMMARY OF THE INVENTION

Accordingly, it is an object of the present invention to provide a novel method and apparatus for switching data between TDM buses.

It is an important object of the present invention to provide a novel method and apparatus for switching data wherein the data components within the TDM data stream are of different speeds.

It is a further object of the present invention to provide a novel method and apparatus for full duplex switching between TDM data buses.

According to the present invention, data is switched between a plurality of first TDM buses and a plurality of second TDM buses by sequentially receiving successive data words from each of the first TDM buses for a predetermined time interval. Each of the data words substantially upon receipt is written into one of a first set of predetermined memory locations. The stored words are then read in a predetermined order and the presently read data word is written onto a data bus. Substantially simultaneously with the present data word being written onto the data bus, the data bus is read and the word is stored in one of a second set of predetermined memory locations. The predetermined memory locations in the second set correspond to particular time slots within each of the predetermined time intervals. The rearranged memory may then be read and the presently read data word written to one of the second TDM buses which is currently enabled in the reading time slot.

In a preferred form of the present invention, the memory locations are in a plurality of memory units, each of which is divided into four quadrants. As data is being received from the first TDM buses and read into a first quadrant of each memory, prior stored data may be read from a second quadrant of the memory and written onto a backplane data bus. Substantially, simultaneously therewith, the data is read from the backplane data bus into a third quadrant of the memory, while data stored in a fourth quadrant is written to the second TDM buses. Data is read into a quadrant until the quadrant is full, and is then swapped to another quadrant in the memory for read out.

A particularly useful aspect of the present invention for telephone systems is that one such backplane data bus may be coupled to a plurality of quadrant configured memories. Since each memory may handle a plurality of TDM buses, the amount of data switched on the data bus may serve a large number of end users as is typically required for telephone applications.

These and other objects advantages and features of the present invention will become more apparent from the following description when read in conjunction with the drawings and the appended claims.

DESCRIPTION OF THE PREFERRED EMBODIMENT

Figure 1:
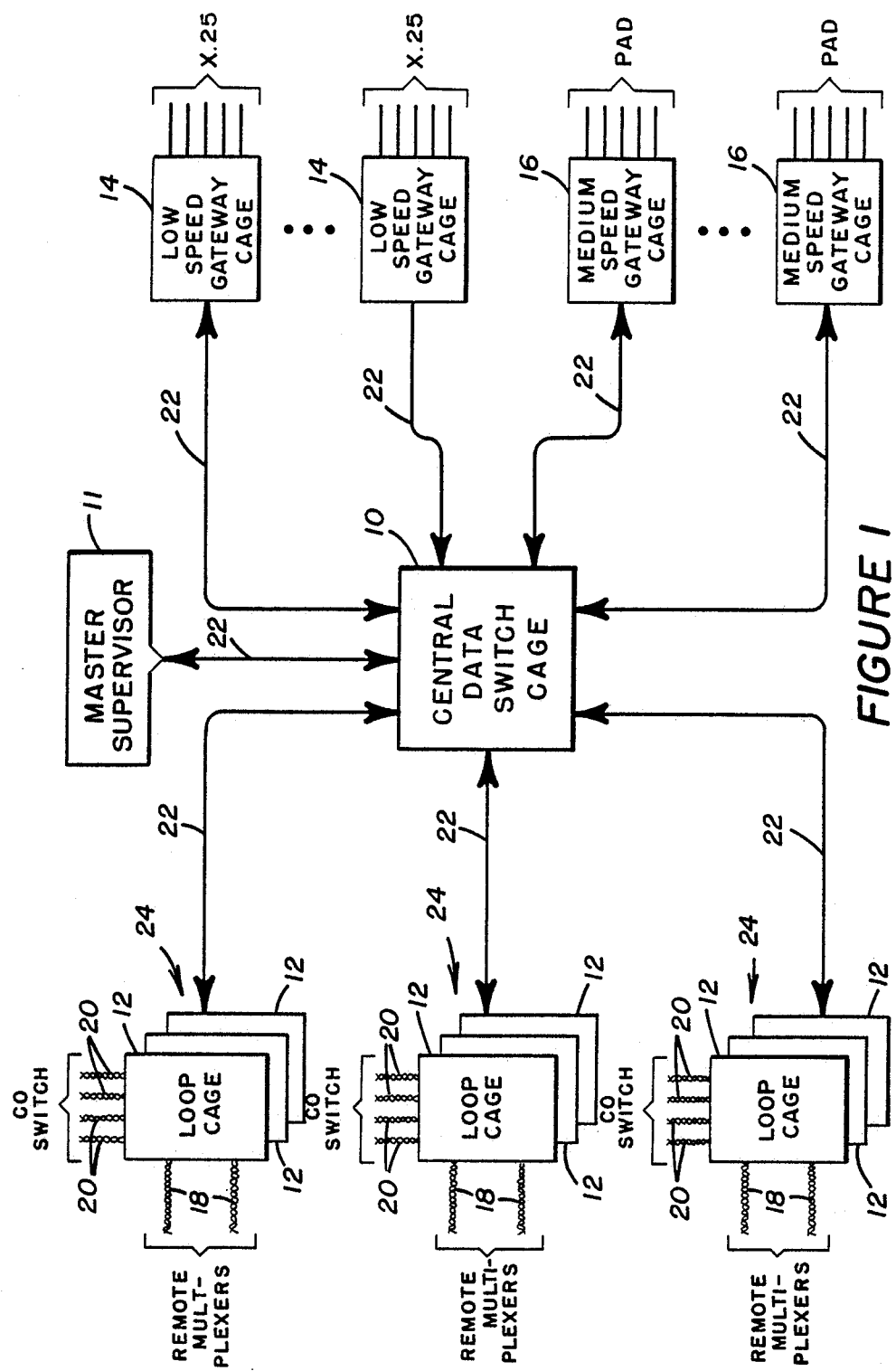
FIG. 1 is a schematic block diagram of a portion of a telephone system central office.

Referring now to FIG. 1, there is shown a schematic block diagram representative of a portion of a telephone system central office incorporating the central data switch cage 10 constructed according to the principles of the present invention. The switch cage 10 is controlled by a master supervisor 11 as described below. Connected to the central data switch cage 10 in the central office are a plurality of loop cages 12, a plurality of low speed gateways 14, and a plurality of medium speed gateways 16.

Each loop cage 12 provides a termination for a plurality of twisted pair subscriber loops 18. Each subscriber loop 18 couples a remote multiplexer (not shown) located at the subscriber premises to the central office loop cage 12. Functionally, the remote multiplexer multiplexes the digital voice and data channels for transmission along the associated subscriber loop 18 using time compression multiplex (TCM) transmission format. The remote multiplexer is fully described in copending application Ser. No. 791,304, filed Oct. 25, 1985, which is assigned to the assignee of the present invention, and is incorporated herein by reference.

The loop cage 12 demultiplexes the TCM signals generated by each remote multiplexer and transmitted over the associated subscriber loop 18 by first separating the voice channels from the digital data channels. Typically, the information flows to and from the remote multiplexers in a series of alternate direction bursts. The loop cage 12 also may convert the digital voice channels in each received burst into analog voice channels for application to a conventional central office switch (not shown) over twisted pairs 20. In the case of a digital central office switch, the voice data may remain in digital format. As a further alternative, voice data may be switched in the central data switch cage 10 along with the other data as described below. The loop cage 12 further multiplexes the digital data channels received from each of the subscriber loops 18. In a preferred embodiment of the present invention, one TDM bus 22 couples three loop cages 12, hereinafter referred to as a loop tri-cage 24, to the central data switch cage 10.

Each low speed gateway 14 demultiplexes data received from the TDM bus 22 associated therewith for distribution to a data services vendor. In the preferred embodiment, the interface between the data services vendors and the low speed gateway is an X.25 interface. Conversely, each low speed gateway 14 multiplexes data received from the X.25 interfaces for transmission over the TDM bus 22 associated therewith to the central data switch cage 10. The low speed gateway 14 is fully described in co-pending application entitled Low Speed Gate Circuit, Ser. No. 814,632, filed Dec. 30, 1985, assigned to the assignee of the present invention.

Similarly, each medium speed gateway 16 demultiplexes data received from the TDM bus 22 associated therewith for distribution to a data services vendor. In the preferred embodiment, the interface between the data services vendor and the medium speed gateway is a conventional packet assembler/disassembler (PAD) interface. Conversely, each medium speed gateway 16 multiplexes data received from the PAD interfaces for transmission over the TDM bus 22 associated therewith to the central data switch cage 10. In a preferred form of the invention, the medium speed gateways 16 are substantially identical in function and arrangement to the loop cages 12.

The TDM buses 22 connecting the central data switch cage 10 to the low and medium speed gateways 14 and 16 are identical to the TDM buses 22 coupling each loop tri-cage 24 to the central data switch cage 10. The TDM bit rate, frame size, and the frame rate and frame period are identical for these buses. Therefore, any reference hereinafter to TDM buses 22 shall include the buses connecting the data switch 10 to any of the loop tri-cages 24, low speed gateways 14 and medium speed gateways 16. An advantage of making each bus 22 identical regardless of its termination from the data switch 10 is that any mix of devices may be accommodated within each central office. In this respect, there is no requirement for a set number of loop tri-cages 24 or low and medium speed gateways 14 and 16. It is thus a clear advantage of the present invention that it provides great flexibility in configuring the data communication paths of each central office.

In a preferred embodiment, each input TDM channel from the loop tri-cage 24 carries data from up to 144 subscriber loops 18 with each subscriber being allotted four low speed subchannels and one medium speed digital subchannel. If the switch cage 22 is also used for voice switching, the subscriber may also be allotted two voice subchannels, which may be switched as described below for the medium speed digital subchannels. Each medium speed gateway 14 uses a TDM bus for up to 216 medium speed subchannels. Each low speed gateway 14 uses a TDM channel for up to 1,728 low speed subchannels. A system can be configured with loop tri-cages 24 and medium and low speed gateways 14 and 16 as desired. The system also allows other devices to be coupled to the data switch cage 10 over TDM buses 22.

Furthermore, as will be described in greater detail hereinbelow, since each TDM bus 22 is identical, data communications need not just occur between a loop tri-cage 24 and one of the low or medium speed gateways 14 and 16. The data communication path through the central data switch cage 10 can occur between any of the TDM buses 22 including both directions on the same TDM bus 22. For example, data communications may occur between individual subscribers coupled to separate loop cages 12 such that the data switch 10 will switch data between the respective loop cages 12. The data switch 10 may also switch digitized voice data, as well as other data, between one or more loop cages 12 along the TDM buses 22. Similarly, data may be switched between separate PAD's through the central data switch cage 10. Therefore, the present invention is useful in other applications as well as part of a telephone switching system. The present invention is the novel method and apparatus embodied within the central data switch cage 10, as hereinbelow described.

Figure 2:
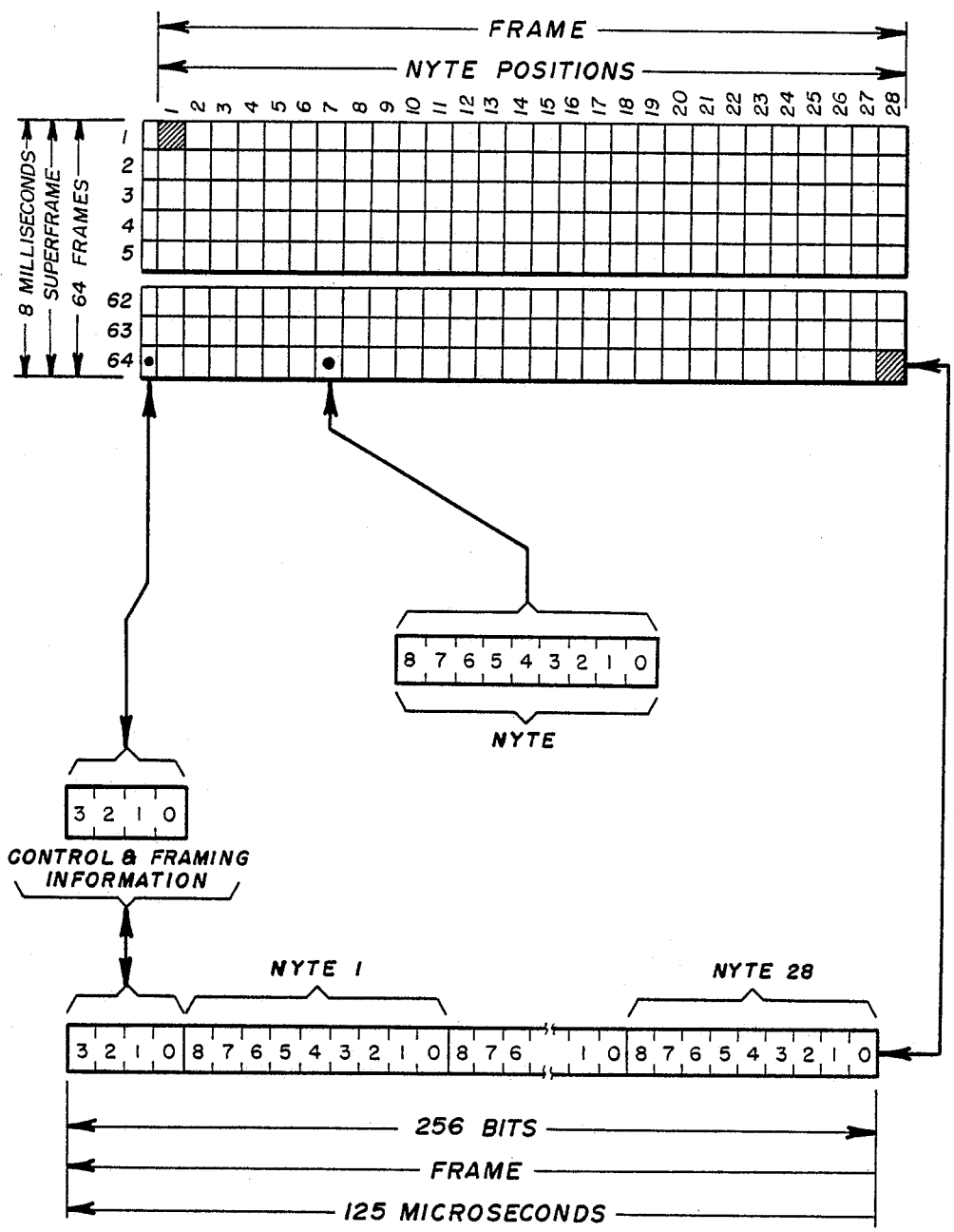
FIG. 2 is a data format diagram associated with the operation of the central data switch cage of FIG. 1.
Figure 3:
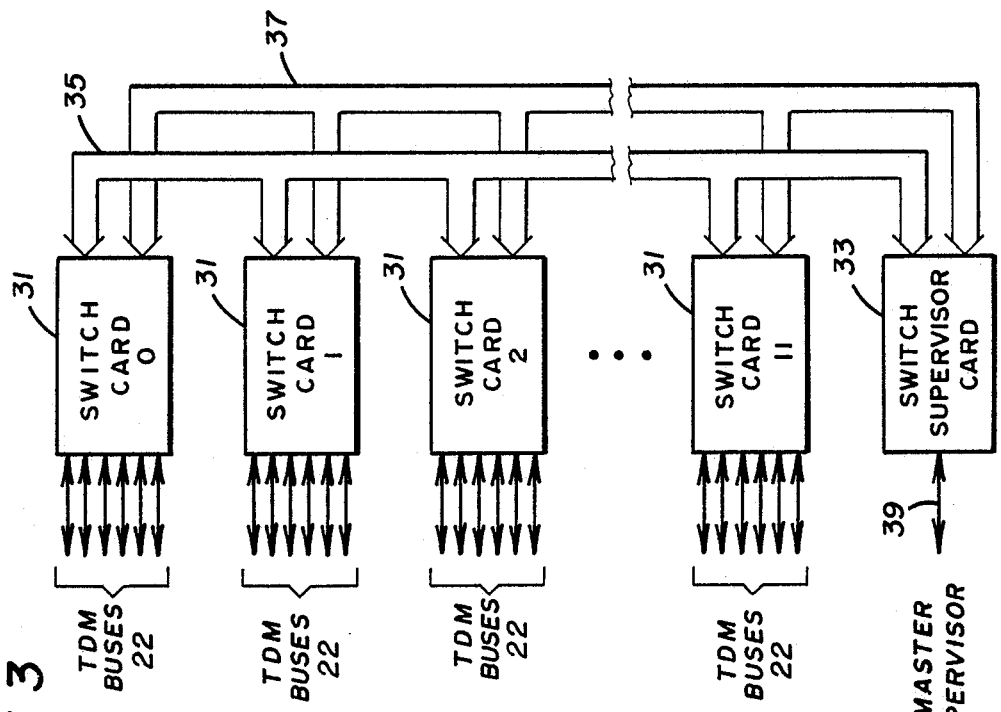
FIG. 3 is a schematic block diagram of the central data switch cage of FIG. 1.

To understand the overall operation of the central data switch cage 10 and the present invention, it is necessary to describe the preferred overall timing relationships of the input and output data strings, as well as the internal timing of the central data switch cage 10. The entire system runs synchronously under control of a 16.384 mHz backplane clock signal provided by a suitable main timing control (not shown) on the switch supervisor card 33 (FIG. 3). Each TDM input is a 2.048 megabit per second serial data stream organized as shown in FIG. 2. It consists of 64 frames of 256 bits per frame. The first four bits of each frame are used for framing signals and the remaining 252 bits represent 28, 9 bit bytes. Hereinafter such 9 bit byte quantities are referred to as "nytes".

Each frame is 125 microseconds long with 64 frames constituting a superframe eight milliseconds in length. The nytes from up to 72 TDM channels are collected and subsequently output onto a central data switch backplane bus (described below), 9 bits parallel, at a 16.384 meganyte per second rate.

The input and output data buses, being identical in format, run synchronously within the central office at 2.048 megabits per second. Each input TDM channel carries data allotted to low speed and medium speed digital data channels (and voice if desired). The design of the data switch 10 may support up to 72 TDM channels. These TDM input channels may be from any number of sources as long as the data arrival times at the data switch 10 interface are maintained in synchronism with the basic system timing reference of the central office. Generally, each data switch cage 10 includes 12 switch cards and an associated switch supervisor card. Each switch card is configured to accept six TDM channels. The TDM data is organized in eight millisecond superframes. As described in greater detail below, a data component switched through the data switch cage 10 adds two superframe times or sixteen milliseconds to the data path.

The central data switch cage 10 (FIG. 3), in the preferred embodiment, includes of a plurality of data switch cards 31 supported by a backplane bus 35. Twelve positions are for switch cards 31 and one is for the switch supervisor card 33. A second bus 37 is provided for redundancy. Each card 31, 33 communicates with the high speed bus 35, 37 on the backplane. The switch cards also connect with the TDM cable connector to provide access to the TDM busses 22. The TDM cables plugged in here go directly to the gateways and loopcages (FIG. 1). The switch supervisor card 33 has a TDM cable connector 39 for communication with the master supervisor 11 (FIG. 1) and a suitable control and management system (not shown).

The TDM channels 22 interface with the switch cards 31, which communicate with each other over the high speed backplane bus 35. The switch supervisor card 33 provides all the timing and control pulses for the switch cards 31, backplane 35, 37 and TDM 22 channels.

The data from all the 72 TDM channels appears on the high speed backplane bus during the same interval as a single superframe, that is the eight millisecond superframe period. Each TDM bit time encompasses eight backplane nyte time positions and thus each nyte time is coincident with 72 backplane nyte times. To allow for a switch card to switch quadrants as described below, the first nyte position of frame 1 and the last nyte position of frame 64 are not used, as shown in the CDS-TDM data format of FIG. 2.

The capacity of the switch high speed back plane bus is derived from converting the nytes from serial bits to nine parallel bits on the bus 35, which is nine parallel wires. This increases capacity by a factor of 9. In addition, a 16 mHz bit frequency is used instead of 2 mHz as on the TDM buses for a factor of 8 increase in capacity. Thus, 72 TDM channels can be accommodated over backplane bus 35.

Figure 4:
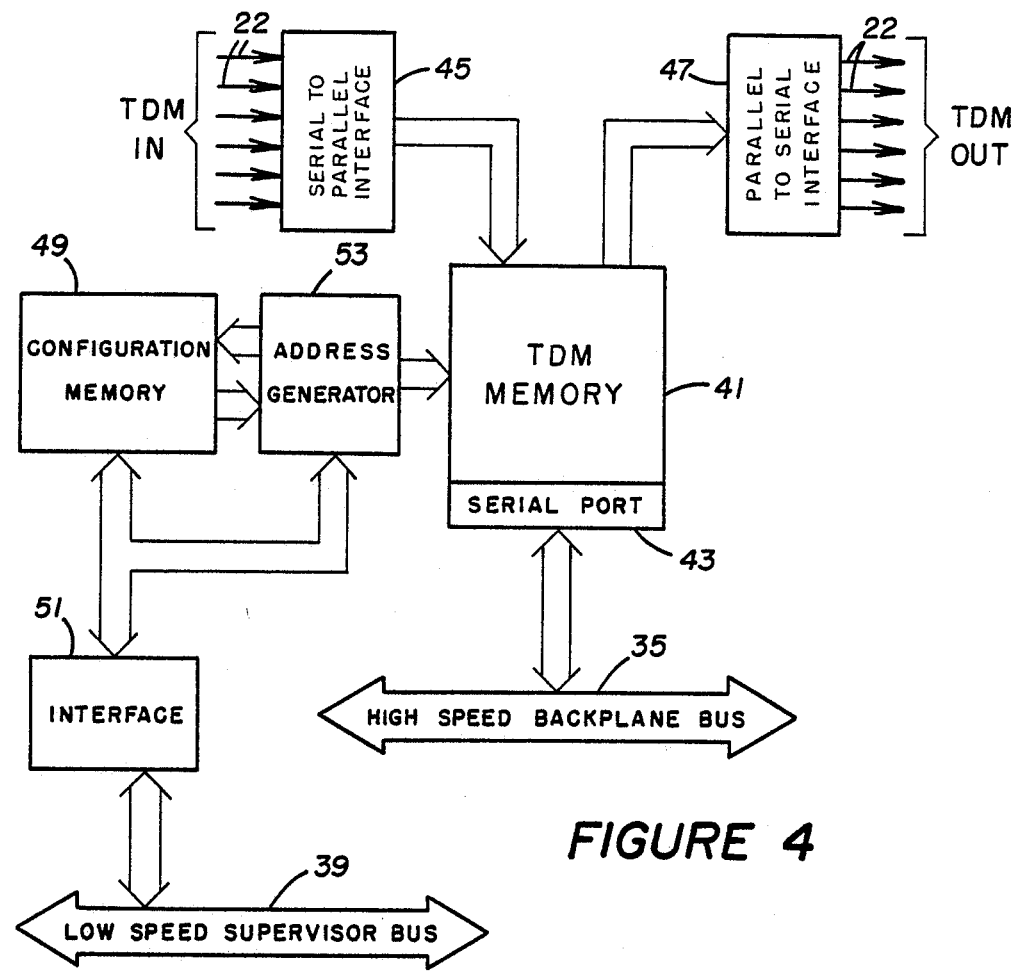
FIG. 4 is a schematic block diagram of each switch card of FIG. 3.

A switch cage backplane (not shown), serves to interconnect the switch cards 31, and the supervisor card 33 as well as providing a path for the TDM signals to go from the switch cards to the TDM buses. As best seen in FIG. 4, a low speed supervisor bus 39 is provided to interconnect the supervisor card with the switch cards to supervise the memory mapped in the switch card memories for the low speed data.

As may also be seen in FIG. 4, each switch card 31 includes a TDM memory 41 connected to the high speed back plane bus 35 via a serial port 43. A serial to parallel interface 45 and a parallel to serial interface 47 couples the TDM memory to the TDM channels 22. A configuration memory 49 interacts with the low speed supervisor bus 39 through an appropriate interface 51 to operate an address generator 53. The address generator 53 is coupled to the TDM memory and provides control over the location in which the various data words are stored in and read out of the TDM memory 41. The TDM memory, in the preferred embodiment, is comprised of four quadrants. The total amount of information which may be stored in one quadrant is referred to hereinafter as a galactic frame.

Figure 5:
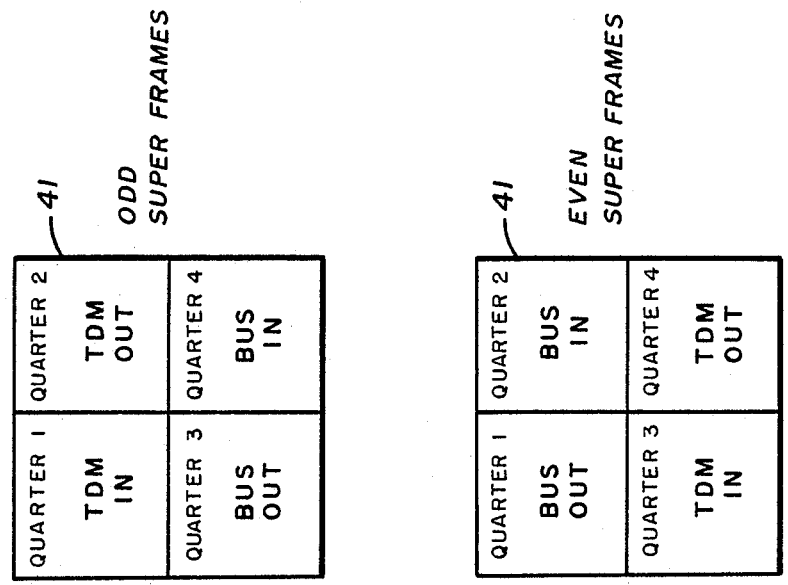
FIG. 5 is a memory map of the TDM memory of FIG. 4.

In FIG. 5, a simplified block diagram of the central data switch card memory data flow section is shown. In a preferred embodiment, each card 31 is configured with a multiported 262,144 by 10 bit memory 41. This memory is capable of storing four full galactic frames. During each galactic frame, the following data transfers occur simultaneously:

1. Serial TDM data for six input TDM buses is converted to parallel and stored into a quarter of the switch card memory;

2 Parallel data from another quarter of the switch card memory is read and converted to serial and output as six output TDM buses;

3. A copy of an entire galactic frame from the backplane bus is stored into another quarter of the switch card memory; and 4. The fourth quarter of the switch card memory is used to drive the high speed backplane bus with selected nyte positions.

As best seen in FIG. 5, after the lapse of each galactic frame time, the assignment of the switch card memory quarters is altered. The TDM input area and the backplane output area swap places. Similarly, the TDM output area and the backplane input area swap places. This may be simply accomplished by changing the state of the most significant bit of the addresses for each of these quarters.

Addressing of the switch card memory 41 is accomplished by the address generator 53 providing sequential access, refresh, and TDM and channel mapped addresses. This address generator works in conjunction with the configuration memory 49 which maps the nyte position of the six TDM buses into the switch card memory 41 and thus into the galactic frame. The interface 51 from the configuration memory to the low speed backplane bus 39 provides communication with the switch cage supervisor card.

Figure 6:
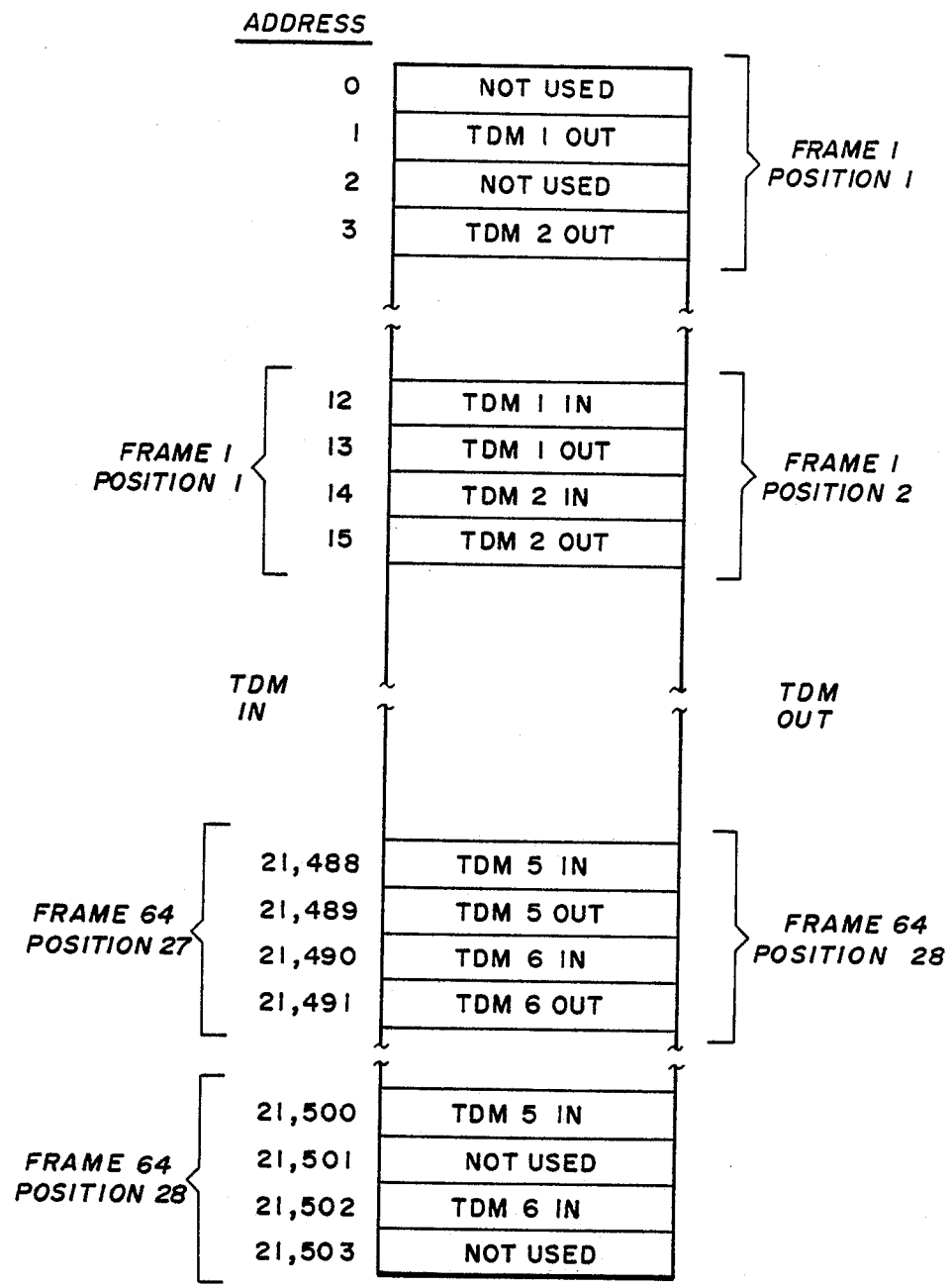
FIG. 6 is a memory map of the configuration memory of FIG. 4.

In the preferred embodiment, the configuration memory 49 consists of 24,576 words of 24 bits each. The layout of the configuration memory is shown in FIG. 6. Each of the six TDM buses consist of 1,792 nyte positions in each superframe. A memory location or address for each nyte position of each TDM bus is needed for each direction (TDM channels in and out) for full duplex switching. The resulting 21,504 locations are used to hold the addresses of nyte positions of the switch card memory 41. Thus each nyte position of a TDM channel corresponds to the nyte storage location in the switch card memory and hence, also corresponds to locations in° the high speed backplane bus galactic frame. The configuration memory is loaded by the switch cage supervisor over the low speed backplane bus 39. The TDM input positions and the TDM output positions are offset by one nyte position.

Figure 7:
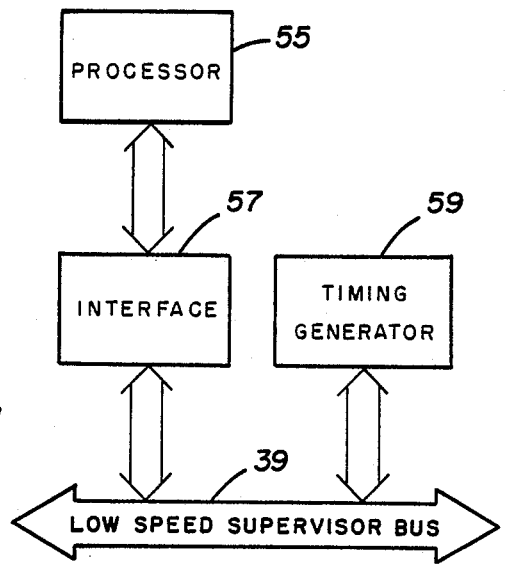
FIG. 7 is a schematic block diagram of the supervisor card of FIG. 3.

The switch cage supervisor illustrated in FIG. 7, shows the supervisory processor section 55 with its interface 57 to the low speed switch cage supervisor bus 39 for communication with the switch card configuration memories. A timing generator 59 provides all timing signals on the supervisor bus 39 to operate the switch memories and TDM channel over the high speed backplane bus 35.

In operation, the data switch of the invention accepts time division multiplexed data channels from a plurality of input data buses and selectively multiplexes these inputs onto a common high speed internal bus from which the data may be demultiplexed for distribution back onto TDM channels leading to other locations. This is accomplished by organizing the incoming data into a series of galactic frames which are then dumped onto an internal or backplane bus serving the memory. The galactic frame on the backplane bus is then restored in the memory in a desired order for subsequent readout back to the TDM buses.

More particularly, a nyte arriving at one of the switch cards 31 is stored at a particular location in a quadrant of the memory of that switch card. The particular storage location is determined by the switch supervisor card 33 which, in turn, is instructed from the master supervisor 11 (FIG. 1). Once the memory quadrant in which the nyte is stored is full, the memory swaps the entire galactic frame in that quadrant to a read-out quadrant of the memory, from which it is read out, nyte by nyte in the order in which the nytes were stored and in parallel format, onto the nine-wire backplane bus 35.

Once on the backplane bus, each nyte is read out to a particular location in a quadrant of a memory in the same or a different switch card connected to the bus. The specific switch card to which the nyte is routed is once again determined by the switch supervisor as set by the master supervisor. Once that quadrant is filled with a galactic superframe of nytes from various other locations, it is swapped into a read-out quadrant of the same memory. From there, the nytes are read out serially onto a particular one of the TDM buses in an order determined by the switch supervisor card, as instructed by the master supervisor.

Thus the sorting function of the switch takes place at three levels: the input to the switch cards from the TDM buses (according to location in the galactic frame assembled in memory), the read-out from the backplane bus (according to the switch card to which the nyte is routed), and the output to the TDM buses from the switch cards (according to the order in which the nytes are read out from memory and the particular TDM buses onto which each nyte is routed). This, coupled with the fact that a further sorting function can be performed between several central data switch cages through appropriate routing of TDM buses, provides a very rapid and reliable means for switching digital information.

It may be seen, therefore, that the invention provides an improved and novel time division multiplex data switch which provides for full duplex data switching between TDM buses in accordance with the time slot or channel to which each data component is assigned. Data of different speeds is readily handled in a simple and reliable arrangement and at extremely high speed.

Various modifications of the invention in addition to those shown and described herein will become apparent to those skilled in the art from the foregoing description and accompanying drawings. Such modifications are intended to fall within the scope of the appended claims.

What is claimed is:

1. A method of switching data between a plurality of first TDM buses and a plurality of second TDM buses each TDM bus transmitting data words in serial format, said method comprising the steps of:

(a) receiving successive data words from said first TDM buses and simultaneously writing each of said data words substantially upon receipt from each of said first TDM buses in a predetermined location with a first quadrant of a memory until said first quadrant of memory is full, said first quadrant of said memory storing a plurality of data words, said first quadrant being filled in a predetermined time interval;

(b) reading in a predetermined order each of a plurality of prior stored data words in a second quadrant of said memory until said second quadrant of said memory is empty and writing the read data words to selected ones of said second TDM buses in accordance with a preassigned time slot of said predetermined time interval;

(c) reading in a predetermined order each of a plurality of prior stored data words in a third quadrant of said memory until said third quadrant of said memory is empty and writing the read data words to a backplane data bus in parallel format at a rate which is equivalent to the rate at which said data words are accumulated in said first quadrant of memory from all of said first TDM buses combined to empty said first quadrant of memory in a time substantially equal to said predetermined time interval, (d) writing each data word present on said backplane data bus to a predetermined location within a fourth quadrant of said memory until said fourth quadrant of said memory is full, said fourth quadrant of said memory storing a plurality of data words, each said predetermined location being associated with a time slot within said predetermined time interval;

(e) transferring the data words stored in said first quadrant to said third quadrant and transferring the data words stored in said fourth quadrant to said second quadrant at the end of said predetermined time interval; and (f) repeating steps (a)–(f).

2. A method as set forth in claim 1 wherein said writing step includes:

contemporaneously generating a first address associated with said predetermined location in said first quadrant in accordance with the present time slot of said time interval, a second address associated with the location of each prior stored data word in said second quadrant, a third address associated with the location of each prior stored data word in said third quadrant, and a fourth address associated with said predetermined location in said fourth quadrant in accordance with the present time slot of said time interval; and applying each said address to said memory to enable the reading or writing of the addressed location.

3. A method as set forth in claim 2 wherein said generating step includes reading successive locations of a configuration memory once during each time slot of said time interval, each successive location of said configuration memory storing said first, second, third and fourth addresses corresponding to the present time slot.

4. A method as set forth in claim 2 wherein said transferring step includes interchanging said first address and said third address and interchanging said second address and said fourth address for each time slot in each successive time interval.

5. An apparatus for switching data between a plurality of first TDM buses and a plurality of second TDM buses, each TDM bus transmitting data words in serial format, comprising:

means for receiving successive data words from each of said first TDM buses;

a memory having first, second, third and fourth quadrants;

first writing means for writing each said data word upon receipt in a first predetermined order in said first quadrant said first quadrant being filled in a predetermined time interval;

means for reading each prior stored data word in said second quadrant and for writing in serial format each prior stored data word as read to one of said second TDM buses during said predetermined time interval simultaneously with each said data word being written into said first quadrant;

a backplane data bus;

means for reading each prior stored data word in said third quadrant and writing all said prior stored data words to said backplane data bus in parallel format at a rate which is substantially equivalent to the rate at which said data words are accumulated in said first memory means from all of said first TDM buses combined to empty said first quadrant of memory in a time substantially equal to said predetermined time interval;

second writing means for writing each data word present on said backplane data bus to said fourth quadrant simultaneously with said data word being written to said backplane data bus during said predetermined time interval; and means for swapping data in said first and third quadrants and in said second and fourth quadrants at the end of said predetermined time interval.

6. An apparatus as set forth in claim 5 wherein said first writing means includes:

means for contemporaneously generating a first address associated with said predetermined location in said first quadrant in accordance with the present time slot of said time interval, a second address associated with the location of each prior stored data word in said second quadrant, a third address associated with the location of each prior stored data word in said third quadrant, and a fourth address associated with said predetermined location in said fourth quadrant in accordance with the present time slot of said time interval; and means for applying each said address to said memory to enable the reading or writing of the addressed locations.

7. An apparatus as set forth in claim 6 wherein said generating means includes means for reading successive locations of said configuration memory once during each time slot of said time interval, each successive location of said configuration memory storing said first, second, third and fourth addresses corresponding to the present time slot.

8. An apparatus as set forth in claim 6 wherein said interchanging means includes means for interchanging said first address and said third address and for interchanging said second address and said fourth address for each time slot in each successive time interval.

9. In a telephone system having a plurality of time division multiplexers, each of said multiplexers multiplexing data words received from a plurality of end devices associated therewith onto an outgoing TDM bus in serial format and demultiplexing data words received in serial format from an incoming TDM bus for distribution to said end devices associated therewith, a full duplex data switch for switching each data word on each outgoing bus to one of said incoming TDM buses in accordance with the time slot each said data word has been assigned, comprising:

N number of memories, each of said memories having first, second, third and fourth quadrants, M number of said outgoing TDM buses and M number of said incoming TDM buses being associated with each of said memories;

means for receiving successive data words from each of said outgoing TDM buses and for writing each said data word upon receipt into a predetermined location in said first quadrant of one of said memories associated with each of said outgoing TDM buses, said first quadrants being filled in a predetermined time interval;

means for reading prior stored data words in said second quadrant in each of said memories simultaneous with each said data word being received and writing the presently read data word in each of said memories to one of said incoming TDM buses associated therewith in accordance with the time slot assignment of said data word;

a backplane data bus connected to each of said memories;

means for reading each prior stored data word in said third quadrant of each of said memories and sequentially writing all said data words from said third quadrant of each of said memories in parallel format to said data bus and writing the data word present on said data bus to a predetermined location in said fourth quadrant of one of said memories, all occurring simultaneously at a rate equivalent to the rate at which said data words are accumulated in said first memory means from all of said first TDM buses combined to empty the first quadrants of all said memories in a time substantially equal to said predetermined time interval; and means for swapping data between said first and third quadrants and between said second and fourth quadrants in each of said memories at the end of said predetermined interval.

* * * * *